United States Patent Office 3,726,660
Patented Apr. 10, 1973

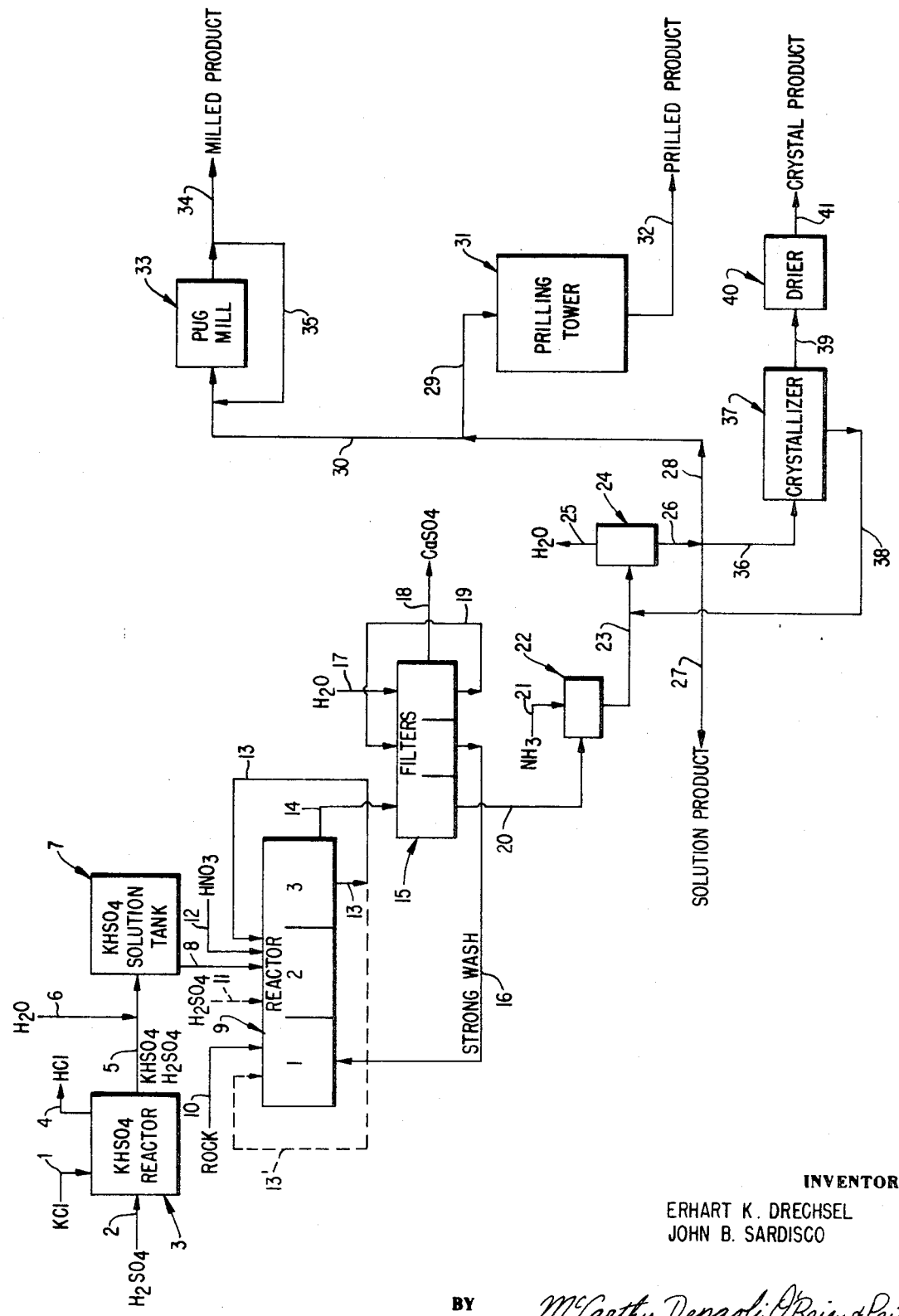

3,726,660
NITROPHOSPHATE FERTILIZER PRODUCTION
Erhart K. Drechsel, Houston, Tex., and John B. Sardisco, Shreveport, La., assignors to Pennzoil Company, Shreveport, La.
Filed Apr. 23, 1971, Ser. No. 136,960
Int. Cl. C05b 11/04
U.S. Cl. 71—37          2 Claims

ABSTRACT OF THE DISCLOSURE

Nitrogen-phosphate-potassium fertilizer products are prepared by the reaction of phosphate rock or a solubilized form thereof and potassium hydrogen sulfate in the presence of nitric acid and the necessary amount of sulfuric acid to assure good filterability of the gypsum crystals at a temperature of about 40–90° C., the resulting mixture is filtered to remove the calcium sulfate precipitate and the resulting filtrate processed to provide a solution product, a crystallized product, a prilled product or a milled product or the resulting filtrate is treated with ammonia to provide nitrogen values and thereafter worked-up to a crystallized product, a solution product, a prilled product or a milled product.

CROSS-REFERENCE TO RELATED APPLICATIONS

This application is related to co-pending application Ser. No. 755,699, filed Aug. 27, 1968, now U.S. Pat. No. 3,600,152, co-pending application Ser. No. 81,280, filed Oct. 16, 1970, and co-pending application Ser. No. 135,297, filed Apr. 19, 1971, all of the same assignee.

BACKGROUND OF THE INVENTION

Field of the invention

This invention relates to processes for the production of fertilizer products in solution or solid form and high in the plant food values of nitrogen, phosphorus and potassium, and optionally ammonia, wherein nitric acid is employed in the acidulation of the phosphate raw material.

Description of the prior art

For many years the fertilizer industry has been engaged in seeking processes for the production of fertilizers which contain high plant food values, which fertilizers are hopefully prepared in an economical manner from readily available raw materials. Preferably, such fertilizers would contain high values of nitrogen, phosphorus and potassium as well as minor amounts of micronutrients in order to properly fertilize the soil. As is well known, most fertilizers are evaluated on the basis of their nitrogen, phosphorus and potassium content and thus are usually rated by their N-P-K value. In many ways liquid ammonia represents the ultimate in nitrogen containing fertilizers as attempts to modify ammonia in any way simply lowers the amount of nitrogen therein. For example, ammonium nitrate contains 35 percent nitrogen and urea contains 46.6 percent nitrogen. Combinations of nitrogen with potash as in potassium nitrate, or with phosphorus-containing materials, such as in diammonium phosphate, while achieving a substantial degree of commercial acceptance, do not offer any really significant economic or agronomic advantages.

It is also known that fertilizer materials containing nitrophosphates can be obtained through the acidulation of phosphate rock or a solubilized form thereof with nitric acid or mixture of nitric acid and other mineral acids. While such processes of the art have several advantages, particularly in their independence of sulfur availability, they also have serious shortcomings. Thus, the presence of calcium in the final product necessarily lowers plant food values and the hygroscopic character of the resulting calcium nitrate creates difficulties in storage. Most of the refinements of this technology provide some means of eliminating or circumventing problems created by the calcium nitrate.

In none of these prior art procedures, however, is there provided a satisfactory solution to the problem of providing an economically feasible and cyclic or continuous process in which nitric acid can be incorporated into the acidulation of phosphate rock without the presence of the problem created by the formation of calcium nitrate.

In the above-mentioned co-pending prior applications of the same assignee, there are disclosed potassium polyphosphate products and processes for the preparation thereof which approach or perhaps surpass the versatility of ammonia as the ultimate conventional potash and phosphate fertilizer material. In these prior applications, there are disclosed potassium polyphosphate products and especially processes for the preparation of such materials by the reaction of phosphate rock or solubilized form thereof, sulfuric acid and potassium hydrogen sulfate in such a continuous manner that high quality potassium phosphates are recovered from the reaction. The process of the present invention provides a procedure whereby nitric acid, which replaces essentially all of the sulfuric acid mentioned above, and optionally ammonia may be incorporated into this reaction to provide the high values of nitrogen desired in fertilizers for many applications.

SUMMARY OF THE INVENTION

It is accordingly, one object of the invention to provide procedures for the preparation of potassium phosphates which contain values of nitrogen which overcome or otherwise mitigate the problems of the prior art.

A further object of this invention is to provide procedures for the preparation of high plant food value fertilizer materials by the acidulation of phosphate rock in the presence of potassium hydrogen sulfate and in the presence of nitric acid with a minimum amount of sulfuric acid added, if needed, to control the filterability of the gypsum crystals formed in the reaction.

A still further object of the invention is to provide a process for the preparation of valuable nitrogen-phosphorus potassium fertilizer products which are obtained by the reaction of phosphate rock, potassium hydrogen sulfate and nitric acid and sulfuric acid if needed and the provision of solution products, crystal products, prilled products and milled products from the resulting slurry after removal of the $CaSO_4$.

Other objects and advantages of the present invention will become apparent as the description thereof proceeds.

In satisfaction of the foregoing objects and advantages, there is provided by this invention a process for the preparation of fertilizer materials containing nitrogen, phosphorous and potassium which comprises reacting in a continuous manner phosphate rock or a solublized form thereof with an aqueous solution of potassium hydrogen sulfate and nitric acid, wherein the potassium hydrogen sulfate solution, preferably in admixture with a minium of sulfuric acid, is added at a controlled rate to the acidulation reaction taking place in the reactor, the reactor being maintained at a temperature of about 40–90° C., the slurry resulting from this reaction is sent to a separator where a calcium sulfate precipitate is removed and the resulting filtrate is recovered therefrom. Procedures are also provided whereby this resulting filtrate may be processed by removal of a portion of the liquid therefrom to provide a solution product, whereby all the liquid is removed from the solid and there is provided a crystal product, a prilled product or a milled product. In a further embodiment, ammonia is added to the mixture to increase the nitrogen content of the mixture.

BRIEF DESCRIPTION OF THE DRAWING

Reference is now made to the drawing accompanying the application on which there is set forth a schematic outline of a suitable process for practicing the invention.

DESCRIPTION OF PREFERRED EMBODIMENTS

As indicated above, the process of this invention is concerned with the preparation of nitrogen-containing potassium phosphates and more particularly to processes for producing fertilizer products containing high values of nitrogen, phosphorus and potassium. The process in general comprises the reaction of phosphate rock or a solubilized form thereof with potassium hydrogen sulfate and nitric acid and sulfuric acid if necessary. In practicing this reaction a number of critical criteria are necessarily observed in order to obtain optimum results and products having sufficient purity to be useful in the fertilizer industry. Thus, in the process of this invention, the phosphate rock or solubilized form thereof is contacted with fresh or recycle streams of the other reactants at an elevated temperature of about 40–90° C. In a preferred manner of operation, an agitated solution of the phosphate rock and recycle solution are maintained at a temperature of about 40–90° C. and a 10 to 50 percent aqueous solution of the potassium hydrogen sulfate and about 1 to 10 percent by weight of sulfuric acid, preferably about a 4 percent sulfuric acid and 42 percent potassium hydrogen sulfate solution, are reacted together in a continuous manner. The controlled addition of the potassium hydrogen sulfate and sulfuric acid, if used, aids the process in minimizing concentration gradients and therefore inhibits or eliminates the formation of the insoluble double salts $KHSO_4 \cdot CaSO_4$ and/or $$KHSO_4 \cdot 5CaSO_4$$

These double salts prevent complete formation of the desired products, and the potassium in this double salt is difficult to recover from the by-product cake. Accordingly, the controlled method of addition of the potassium hydrogen sulfate in solution form to the other reactants represents an unexpected and important aspect of the present invention and is critical to the efficiency of the reaction.

In the reaction, it is also desirable that the concentration of dissolved solids not exceed about 60 percent and preferably lie in a range of about 10–40 percent, as higher concentrations of dissolved solids, which are often found in phosphoric acid plants, are not optimum because of the difference in solubilities of the salts present. Therefore, a maximum of about 40 percent by weight of the dissolved solids is desirable in conducting the reaction.

As indicated, the reaction is conducted at a temperature of about 40–90° C. with a highly preferred temperature range being 55–70° C. To this extent the temperature range is critical as conversions may suffer outside the indicated ranges. The residence or hold-up time in the reactor is variable depending on the amounts of reactants and temperature but may range from about 2 to 12 hours for optimum results.

As pointed out above, phosphate rock per se may be employed as the main reactant mineral in the process. However, solubilized mineral forms of the rock, including monocalcium phosphate, dicalcium phosphate, tricalcium phosphate, etc., may also be employed and these are especially desirable in some cases. Mixtures of rock and one or more of these solubilized forms may also be used. It is well known, of course, that the solubilized forms may be prepared from the phosphate rock per se. In one convenient procedure for effecting conversions to a more solubilized form, there may be used aqueous hydrochloric acid with the phosphate rock starting material to produce a reaction mixture containing phosphoric acid, a calcium phosphate and calcium chloride. Reaction of this mixture with additional quantities of the starting phosphate then will precipitate dicalcium phosphate and thereafter, by adding limestone or lime, a suspension containing insoluble dicalcium phosphate and unreacted starting phosphate material can be obtained in a solution of calcium chloride. The solids may be separated and washed until the chloride is removed and thereafter employed in the process of the invention. To improve the economics of this process, the aqueous hydrochloric acid employed may be that obtained as a result of the formation of the $KHSO_4$ by the reaction of KCl and $H_2SO_4$.

Any source of potassium hydrogen sulfate reactant can be employed and added as an aqueous solution of about 10–50 percent strength; however, it is highly preferable to employ as a source of potassium hydrogen sulfate the reaction product of potash (KCl) and concentrated sulfuric acid as the potassium hydrogen sulfate resulting from this reaction has been found to be eminently suitable for use in the invention as it contains very low quantities of chloride. The reaction between the potassium chloride and sulfuric acid in formation of the $KHSO_4$ is generally conducted at a temperature from 250° to 300° C. and the dry HCl evolved may be processed as desired such as recovery and use in the conversion of phosphate rock to a solubilized form. The resulting $KHSO_4$ product is then dissolved in water, or in a dilute recycle stream to the desired concentration suitable for use in the process of the invention.

The sulfuric acid employed, when needed, in addition to that employed in the production of $KHSO_4$, is preferably concentrated sulfuric acid of about 97 percent concentration but concentrations of about 60–98 percent may be used. Commercial concentrated sulfuric acid is preferred, however, because of its ready availability. The excess sulfuric acid is generally utilized to help control the formation of calcium sulfate crystals and allow easy filtration.

While it is mentioned that some sulfuric acid is usually included in the process and added with the $KHSO_4$ solution, the process can also be carried out without the need for sulfuric acid as illustrated by the following equation:

$$Ca_9(PO_4)_6 \cdot CaF_2 + 10KHSO_4 + 4HNO_3 \rightarrow$$
$$10CaSO_4 + 6KH_2PO_4 + 4KNO_3 + 2HF$$

Hence, the above reaction, without added sulfuric acid, is an important aspect of the invention. In this regard, the minimum amount of sulfuric acid that may be used in a plant operation would be the 5 to 10 percent by weight excess used to convert potash to $KHSO_4$ and any excess acid would remain in the $KHSO_4$ solution added to the main reactor. Weightwise, this is 0.066 to 0.131 gram of pure $H_2SO_4$ for each gram of pure potash used. Any sulfuric acid added above this minimum amount would be only to aid in controlling the filterability of the gypsum crystals produced in the reaction. This addition of any excess sulfuric acid would, of course, be held to a minimum because of the undesirability of sulfate in the final product.

The essential feature of the process of the present invention resides in the inclusion of a quantity of nitric acid in the reaction. Ordinary concentrated nitric acid may be used for this purpose and is desired although more dilute solutions may also be used. The presence of the nitric acid in the reaction serves two principal purposes: (1) it provides the hydrogen ions necessary to drive the reaction to completion without increasing the sulfate ion content of the resulting product as would occur if an excess of sulfuric acid was employed to drive the reaction to completion, and (2) it provides the desired amount of nitrogen in the mixture so that the resulting fertilizer contains plant food values of nitrogen, phosphorus and potassium.

The amount of nitric acid to be added to the acidulation reaction may be any amount desired to satisfy the above criteria. However, the especially preferred amount of nitric acid to be used is about 20 to 40 weight percent of the amount of phosphate rock employed.

In conducting the reaction of this invention, the phosphate rock or corresponding starting material is continuously charged to the reactor with the nitric acid, and the potassium hydrogen sulfate aqueous solution (in admixture with any excess sulfuric acid) added in a controlled manner thereto. From the reaction of the phosphate starting material, $KHSO_4$, nitric acid, and any excess sulfuric acid there are formed ions of the desired potassium phosphates contained in phosphoric acid solution together with $Ca^{++}$ and $SO_4^{=}$ which will form a crystalline calcium sulfate precipitate and nitrate ions. Minor amounts of other ions are also present. The crystalline calcium sulfate precipitate is subsequently eliminated from the mixture as by filtration and thereafter the desired products are recovered from the mother liquor. A special feature of the present invention resides in the fact that the nature of the reactants is such that the sulfate ions are substantially completely precipitated and are easily removed from the resulting slurry.

After completion of the reaction in the acidulation reactor, a slurry is obtained which contains ions of the desired products in admixture with a calcium sulfate salt precipitate. This mixture is then separated at about the reaction temperature of the system to provide the resulting solid or filter cake of insoluble calcium sulfate and a filtrate. The filtrate resulting from the filtration step, prior to precipitation of the solid product, contains ions of the desired product in an acidic aqueous solution.

According to the present invention this filtrate can be processed by any of several alternative procedures. Thus, in one embodiment the filtrate may be concentrated directly without further treatment to provide a solution product or dried and further physically treated to provide a crystal product, a prilled product or ground to a milled product.

In an alternative procedure, prior to concentration or drying, the filtrate is treated with ammonia, preferably in the form of gaseous ammonia although liquid or aqueous ammonia may be employed. The ammonia treatment is carried out at a temperature of about 20 to 80° C. with agitation.

The amount of ammonia to be added ranges from about 1 up to about 10 percent by weight of the filtrate being treated. This amount of ammonia provides ammonia values for the product and, thus, also increases the amount of nitrogen in the fertilizer where such is desired. The resulting ammonia-treated filtrate is then treated according to one of the above-described alternative procedures.

In the accompanying drawing, it will be seen that a schematic outline of a process encompassing a preferred procedure for conducting the reaction is illustrated therein. Certain of the alternative procedures are also illustrated.

It is to be understood that various stirrers, pumps, fuel sources, etc., used in conducting the process, are to be included in the operation as they are obvious to one skilled in the art.

Referring now to the drawing, it will be seen initially that $KHSO_4$ is formed by the addition of potash (KCl) and sulfuric acid through lines 1 and 2, respectively, to $KHSO_4$ reactor 3 maintained at a temperature of about 250 to 300° C. wherein the two materials interact to form the potassium hydrogen sulfate for use in the reaction. The dry hydrogen chloride formed is removed by line 4 from the reactor for disposal or use as desired e.g., in conversion of phosphate rock to a solubilized form.

The resulting potassium hydrogen sulfate with any excess $H_2SO_4$ is passed through line 5, after mixing with water from line 6, to tank 7 to form an aqueous solution of about 10–50 percent by weight of $KHSO_4$. This aqueous solution is then fed through line 8 at a controlled rate into the reactor 9 with slurry recycle. The reactors are maintained at a temperature of about 40–90° C. and provided with means for agitation. The phosphate rock reactant is continuously introduced into main reactor 9 by line 10, the reactor 9 being preferably several reactors in series containing, for example, reactors 1, 2 and 3. The phosphate rock is generally contained in the reactor with a solution of a recycle stream as from line 13'. Simultaneously, any desired sulfuric acid is added through line 11 (a dashed line being used to indicate that any $H_2SO_4$ addition is optional), the required nitric acid added through line 12, and the potassium hydrogen sulfate solution added through line 8. The reactor 9 is maintained at a temperature of about 40–90° C. and preferably about 75° C. with means provided for agitation. In the preferred process, the weight of the $KHSO_4$ solution to rock may range from about 1:1 up to about 2:1, respectively. On a molar basis about 4 to 10 moles of $KHSO_4$ are added per mole of rock. As pointed out above, the nitric acid is maintained in an amount of about 20 to 40 percent by weight of the total amount of phosphate rock employed.

In the reactor 9, the reactants are intimately contacted at the temperature range of about 40 to 90° C., and, in a continuous system using a series of reactors, a slurry of the reacting mixture is generally continuously recycled through the system as by lines 13 and 13', either through the first or the intermediate reactors so as to obtain by these optional procedures substantially complete reaction and control of gypsum crystal growth.

The reacting slurry is then removed from the reactor 9 by line 14 and passed to separator 15 which may be a multistage filter or centrifuge and the like, operated at the temperature of about 40–90° C. In this separator, the calcium sulfate precipitate is separated from the slurry by line 18 and removed from the system. During the filtering process, the solids are continuously washed by water introduced through line 17 and the weak wash water is continuously recycled through line 19 so that complete washing of the solids is obtained. During the separation procedure, the strong wash is recycled by line 16 to main reactor 9 for further processing for a more complete reaction.

The filtrate is then removed from the separator by line 20 and passed to storage vessel 22 at which point the filtrate may be processed either with or without treatment with ammonia. Thus, vessel 22 provides the point at which the filtrate may be subjected to the optional procedures for working up of the filtrate coming from the separator. In the embodiments shown, the filtrate in vessel 22 is treated with ammonia, preferably gaseous ammonia, in the required amount to provide additional nitrogen values in the form of ammonia for the mixture. The ammonia is added to the mixture with good agitation.

The mixture coming from vessel 22, untreated or having had ammonia added thereto is then sent to evaporator 24 for further processing. In evaporator 24 two alternatives are provided. In one embodiment, only a portion of the water is removed therefrom as by evaporation by heating at about 70 to 100° C. and a solution product is removed from the evaporator 24 by line 26 and line 27. In an alternative embodiment, substantially complete removal of the water or other liquid is obtained and the resulting concentrated solution or wet solid may be processed by either of several procedures to provide final solid products.

In one procedure, evaporation and cooling of the concentrated solution are utilized so as to provide a supersaturated solution of the product. This supersaturated solution is then withdrawn by line 26 and sent by line 36 to crystallizer 37. Thereafter in crystallizer 37, cooling without agitation is effected and the crystals are allowed to form. While this type of tank crystallization is preferred, other types of crystallizers may also be employed with good results such as the Swenson-Walker Crystallizer, agitated batch crystallizers and the like. Alternatively, a crystallizing evaporator could be used in place of the individual evaporator and crystallizer.

After the crystals are formed they are removed by line 39 while the mother liquor is recycled to line 23 by line 38. The crystals are then dried in drier 40 and the crystalline fertilizer product is recovered in line 41.

In a second alternative, concentration in evaporator 24 is continued until a pasty mass is obtained which is then withdrawn through lines 26 and 28 and sent to pug mill 33 by line 30. In pug mill 33, which may be any conventional apparatus of this type, the pasty mass is passed therethrough wherein it is ground and kneaded thoroughly and discharged through line 34. A portion of the mixture is recycled by line 35 to obtain complete milling. There is thus obtained from line 34 a milled product.

In the third alternative, the evaporation is continued until a pasty mass is obtained which is then sent by lines 26, 28 and 29 to a conventional prilling tower 31. In the prilling tower, the mixture is allowed to descend through the hot air and a prilled product is then recovered from the tower from line 32.

It should be noted at this point that the final solution product, crystal product, prilled product or milled product can alternatively either have the nitrogen value as supplied by the nitric acid used or having had this nitrogen value increased by the addition of ammonia to the mixture through line 21.

The following examples are presented to illustrate the process of the invention but are not to be considered as limitative thereon.

EXAMPLE I

In this example, the apparatus set forth on the drawing and described above was employed for conducting the reaction. In this initial example, the process is practiced to the point at which the filtrate is recovered from the separator that is, the final point of the experimental procedure.

In this example, the feed to the main reactor was as follows: (1) phosphate rock in line 10, 1016 grams, representing by analyses, 422 grams calcium ion, 529 grams phosphate ion, and 65 grams water; (2) sulfuric acid in line 11, 1716 grams, representing 412 grams sulfate ion, and 1304 grams water; (3) potassium hydrogen sulfate in line 8, 2607 grams, representing 244 grams potassium ion, 585 grams sulfate ion and 1778 grams water; and (4) nitric acid in line 12, 967 grams, representing 285 grams nitrate ion and 682 grams water, for a total input of 6306 grams.

The mixture was contacted in the main reactor, a series of three reactors, at a temperature of about 75° C. with recycle of the reacting slurry. The resulting mixture was then taken off and sent to the separator which was a three-stage filter with a water wash and recycle of the first wash to the main reactor. In the filter, a cake weighing 2266 grams and comprising essentially calcium sulfate was removed from the system and a filtrate weighing 3744 grams was removed from the separator for analyses and the final processing procedures. The calcium sulfate cake and the filtrate recovered provided the following analyses:

|  | $CaSO_4$ cake, grams ions | Filtrate, grams ions |
|---|---|---|
| Ca | 386 | 9 |
| K | 59 | 195 |
| $SO_4$ | 916 | 61 |
| $PO_4$ | 95 | 416 |
| $NO_3$ | 0 | 233 |
| $H_2O$ | 810 | 2,830 |
| Total | 2,266 | 3,744 |

In the above analyses of the filter cake and filtrate, it will be observed that the filter cake was substantially calcium sulfate and contained no nitrate ion. Therefore, by this process there was no calcium nitrate lost. On the other hand, the amount of sulfate contained in the filtrate was extremely low and was advantageous in that sulfate is generally an undesirable component and difficult to remove in fertilizer products. However, the filtrate was high in K, $PO_4$ and $NO_3$ ions, the essential components of a fertilizer.

EXAMPLE II

In this laboratory example the filtrate recovered from Example I was processed with the addition of ammonia to provide a crystal product. Thus, in this example, a filtrate having the analyses set forth in Example I. was reacted at room temperature with 213 grams of ammonia, the latter being added slowly with agitation. The resulting mixture was then evaporated to dryness at 125° C. The crystalline product analyzed as follows:

Crystalline product analyses, grams of ions

| | |
|---|---|
| Ca | 9 |
| K | 195 |
| $SO_4$ | 61 |
| $PO_4$ | 416 |
| $NO_3$ | 233 |
| $H_2O$ | |
| $NH_3$ | 213 |
| Total | 1127 |

In reviewing the analyses of the final crystalline product, it will be noted that the analyses is the same as with respect to the filtrate starting material with respect to the calcium, potassium, sulfate, phosphate and nitrate values, but further contains the additional ammonia values.

The invention has been described herein with reference to certain preferred embodiments. However, as obvious variations thereon will become apparent to those skilled in the art, the invention is not to be considered as limited thereto.

What is claimed is:

1. A process for the preparation of fertilizer products containing nitrogen and phosphate values which comprises reacting phosphate rock or a solubilized form thereof with 20–40 weight percent of nitric acid based on the total amount of phosphate rock or solubilized form present in a reactor maintained at a temperature of about 40–90° C. to form a reacting mixture, forming a potassium hydrogen sulfate solution containing 10 to 50% by weight potassium hydrogen sulfate and 1 to 10% sulfuric acid by reacting potassium chloride and sulfuric acid at a temperature of about 250° to 300° C. with evolution of hydrogen chloride and dissolving the potassium sulfate in water, adding said potassium hydrogen sulfate solution to said reacting mixture in a controlled manner to facilitate the crystal growth and filterability of the resulting calcium sulfate precipitate, continuing said reaction at a dissolved solids content of about 10–40 weight percent, until complete acidulation is achieved, removing the resulting slurry and passing to a separator, removing the calcium sulfate precipitate, contacting the resulting filtrate with ammonia in the amount of about 1 to 10% by weight of the filtrate at a temperature of about 20 to 80° C. concentrating the filtrate for removal of excess water and recovering a concentrated aqueous fertilizer product.

2. A process according to claim 1 wherein the reactants are phosphate rock, concentrated nitric acid and a mixture of 10 to 50 percent aqueous solution of potassium hydrogen sulfate containing about 1 to 5 percent by weight of sulfuric acid.

References Cited

UNITED STATES PATENTS

| | | | |
|---|---|---|---|
| 3,049,416 | 8/1962 | Brown et al. | 71—39 X |
| 2,082,809 | 6/1937 | Pennell | 71—61 X |
| 3,600,154 | 8/1971 | Slot et al. | 71—39 |
| 3,429,686 | 2/1969 | Dingemans et al. | 71—39 |
| 1,916,431 | 7/1933 | Larson | 71—39 |

FOREIGN PATENTS

| | | | |
|---|---|---|---|
| 810,208 | 3/1959 | Great Britain | 71—34 |

REUBEN FRIEDMAN, Primary Examiner

R. BARNES, Assistant Examiner

U.S. Cl. X.R.

71—39